May 28, 1974 YASUO HAYASHI ET AL 3,813,424
PROCESS OF THE MANUFACTURE OF DIALKYLTIN OXIDE
Filed June 2, 1972
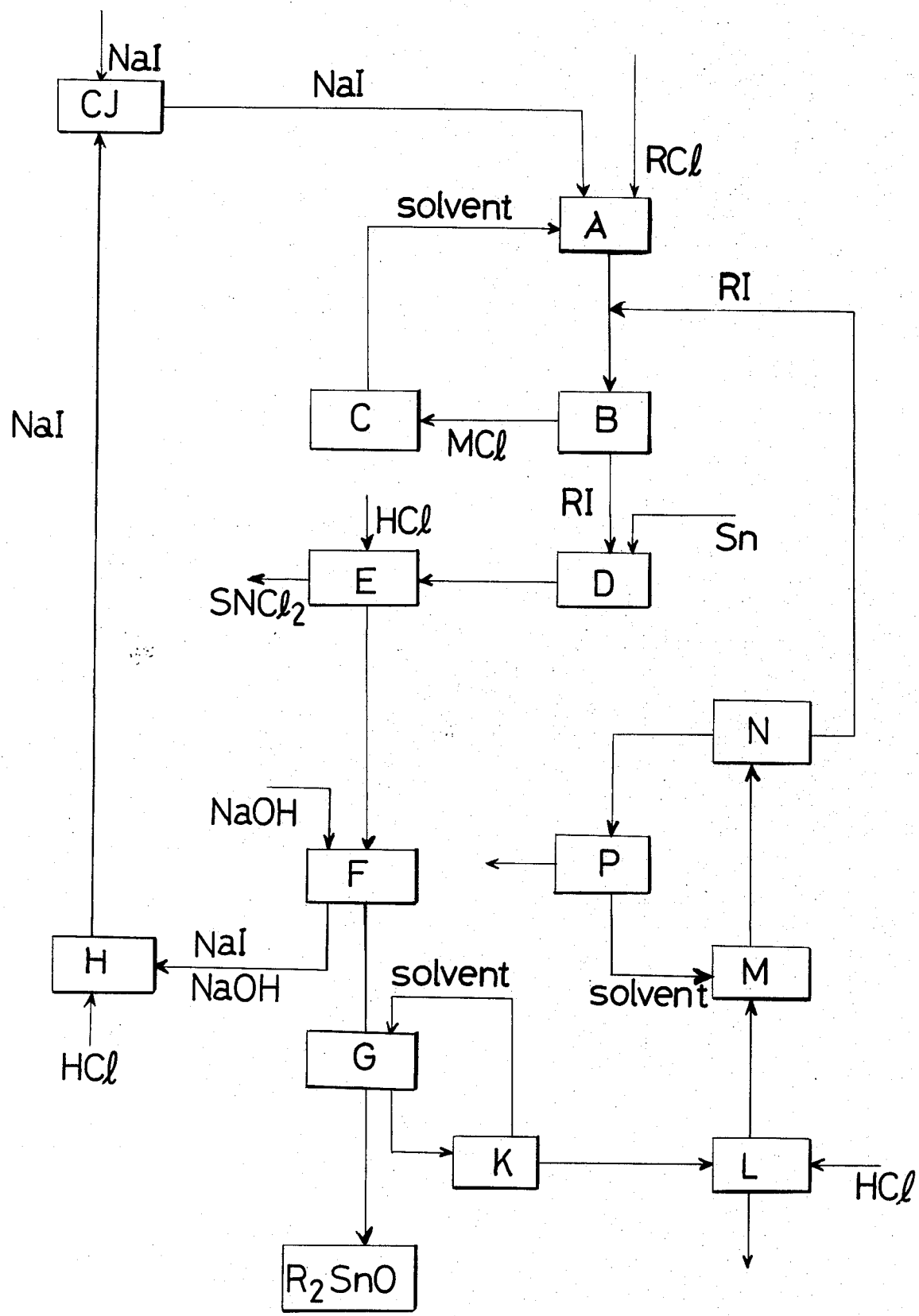

3,813,424
PROCESS OF THE MANUFACTURE OF
DIALKYLTIN OXIDE
Yasuo Hayashi and Yoshiaki Adachi, Fukushima-ken,
Japan, assignors to Kureha Kagaku Kogyo Kabushiki
Kaisha, Tokyo, Japan
Filed June 2, 1972, Ser. No. 259,246
Claims priority, application Japan, June 4, 1971,
46/39,177; June 19, 1971, 46/44,067, 46/44,068
Int. Cl. C07f 7/22
U.S. Cl. 260—429.7                    8 Claims

ABSTRACT OF THE DISCLOSURE

The invention relates to the process for the direct manufacture of dialkyltin oxide through such reaction steps that alkyl iodide is reacted directly with metallic tin to dialkyltin iodide which is then hydrolyzed to the desired product.

The main object of the invention is to provide a process for the manufacture of dialkyltin oxide with least possible loss of iodine and at a maximum possible purity of the final product.

For this purpose, an aqueous alkaline solution appeared from a certain processing stage and containing unrecovered alkali metal iodide after execution of the recovery step thereof is returned to said first step for recirculation.

---

This invention relates to the process for the direct manufacture of dialkyltin oxide through such reaction steps that alkyl iodide is reacted directly with metallic tin to dialkyltin iodide which is then hydrolyzed to the desired product.

The reaction steps of the above-mentioned known manufacturing process, so-called the direct manufacturing one, may be described more specifically in the following way:

$$2RI + Sn \rightarrow R_2SnI_2 \quad (1)$$
$$R_2SnI_2 + 2MOH \rightarrow R_2SnO + 2MI + H_2O \quad (2)$$

where, R stands for an alkyl radical and M for an alkali metal atom.

Since the iodine used in the above process is highly costly, the following modified steps are employed generally.

$$2MI + Cl_2 \rightarrow I_2 + 2MCl \quad (3)$$

Thus, iodine is once separated in accordance with the formula (3), and the iodide is processed further in accordance with either of the following formula (4) or (4').

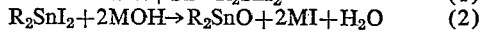
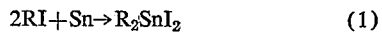
$$6ROH + 2P + 3I_2 \longrightarrow 6RI + 2H_3PO_3 \quad (4)$$
or
$$5ROH + P + \frac{5}{2}I_2 \longrightarrow 5RI + H_3PO_4 + H_2O \quad (4')$$

The reaction is thus brought about with use of alcohol and red phosphorus to generatingly produce alkyl iodide which is then recirculated to the first step, and so on.

In the above-mentioned manufacturing process, it has been encountered that the step expressed by the formula (3) can not progress stoichiometrically, resulting in a loss of iodine. On the other hand, losses of iodine as solute in water and those due to evaporation and those dissipated during the purification steps can not be neglected. Thus, as a whole, the recovery rate of iodine amounts generally to an order of 97%.

In the manufacturing step of alkyl iodide in accordance with either of said formula (4) or (4'), an excess amount of iodine must be used. However, it is found that this excessive iodine is difficult to recover. Further, since the conversion rate of alcohol to alkyl iodide amounts generally to 95–97%, the loss of iodine in the corresponding step may generally be 10–15%. Therefore, the overall loss of iodine is rather high. On the other hand, the use of red phosphorus, as shown in the formula (4) or (4'), fire hazard may also be feared.

A first object of the present invention is to provide a manufacturing process of the above kind, capable of reducing substantially the loss of iodine and with avoidance of fire hazard caused by the use of red phosphorus.

This and further objects, features and advantages of the invention will become more apparent as the description proceeds.

In the case of the manufacture of a higher alkyltin oxide, the alkyl having 8–24 carbon atoms, the alkali iodide as produced in the process according to the formula (2), is reacted with alkyl chloride directly to alkyl iodide which is then recirculated to the first step for reducing substantially the loss of iodine and for avoiding fear of fire hazard caused by use of red phosphorus.

In the progress of the reaction in accordance with the formula (1) for the manufacture of dialkyltin di-iodide, excess amount of alkyl iodide relative to metallic tin must be used, and upon completion of the reaction, non-reacted alkyl iodide must be recovered by, such as, distillation. However, it is encountered that a part of alkyl iodide may be thermally decomposed during the distillation, thus representing an appreciable loss of iodine.

In the case of alkyl iodide, the alkyl thereof belonging to lower alkyl, thus having a relatively low boiling point, the loss of iodine may generally be small. When the alkyl radical has numerous carbon atoms, such as larger than 8, the isolation of iodine from the higher alkyl iodide may be appreciable. In addition thereto, the refining of the corresponding dialkyltin iodide may become rather difficult.

According to the present invention, the reaction product of the said second process, which is raw dialkyltin oxide, containing excess alkyl iodide used in the foregoing first step is subjected to a recovery step of the alkyl iodide by means of specifically selected and returned to the first step for recirculation. In this way, the otherwise higher loss of iodine can be reduced to a possible minimum.

By selecting specifically the solvent for the above purpose, higher dialkyltin oxide, having 8 or more carbon atoms in the alkyl, may be manufactured with a remarkably high purity thereof, as will be more fully understood, as the description further proceeds.

In a generalized sense, the process according to this invention for the manufacture of the aforementioned final product in accordance with the aforementioned two formulae (1) and (2), alkyltin compounds are separated from the reaction mixture of the said second step and then, alkali metal iodide is recovered from the mother liquid and brought into reaction with alkyl chloride in a water-soluble organic solvent to alkyl iodide which is then returned back to the first step reaction system for recirculation therethrough.

More specifically, solid alkyltin compounds are separated from the reaction products of the second step and the aqueous alkaline solution is neutralized and dried. The alkali metal iodide containing a substantial amount of common salt and the like is used as per se for the formation of alkyl iodide.

Thanks to non-utilization of dangerous red phosphorus, the processing steps can be highly simplified and safe-guarded.

The step for the formation of alkyl iodide as used in the process according to this invention can be expressed by the following formula:

$$RCl + MI \rightleftarrows RI + MCl \qquad (5)$$

This reaction is known as Finkelstein reaction and is generally carried out in a water-soluble organic solvent such as methanol, ethanol, acetone or the like. It has been found that in accordance with our knowledge by use of an alcohol such as methanol, ethanol or the like, the once formed sodium chloride will dissolve into the solvent to a less or larger degree, so as to invite a reverse reaction, thus the progress of the reaction in the ordinary order, or more specifically from left to right in the above formula, being disturbed appreciably.

On the other hand, in the case of lower alkyl chloride, having four or less carbon atoms, the alkyl iodide can be obtained at a relatively high yield when used as a lower ketone, such as, especially acetone, methylethyl ketone or the like which is capable of dissolving almost none of sodium chloride. Also in the case of higher alkyl chloride, having $C_8$ or more, acetone, methylethyl ketone or the like solvent is highly recommendable as the solvent. It should be noted, however, the forming velocity of alkyl iodide is highly slow at the boiling point of this kind of solvent, and 20 hours, or frequently more longer reaction period must be taken into account for the completion of the reaction which means naturally a considerable drawback to the desired purpose.

During our exception of profound experiments for acceleration of the above reaction, we have found that a corresponding higher alkyl iodide, even when the alkyl radical has $C_8-C_{24}$, can be obtained with a remarkably high yield, if at least one of the following measures be adopted dependently or in combination.

As a first measure, the reaction is carried out at a considerably high reaction temperature, such as 100–200° C.

As a second measure, a solvent mixture is used which comprises acetone and/or methylethyl ketone as its main constituent(s), being, however, added with dimethylacetamide or dimethylformamide. In this case, the reaction may be carried out at 50–150° C. in an easy way.

When using acetone and/or methylethyl ketone as the solvent, the used quantity thereof will influence substantially upon the reaction velocity. It is recommendable to use such solvent at least two times by weight of the alkali metal iodide used. With use of the solvent less than two times above specified, it is disadvantageous on account of retarded reaction velocity. With use of about 15 times of the solvent relative to the used alkali metal iodide, the material alkyl chloride and the alkyl metal iodide can be perfectly dissolved in the solvent, and thus, even by use of a still higher amount of the solvent, there is no advantageous effect upon the reaction velocity and, therefore, it is not recommendable. Generally speaking, use of the solvent, in the ratio of 2.4–6 times of the alkali metal iodide is highly recommendable. The solvent is not necessarily anhydrous, but it may contain less than 5 wt. percent or so aqueous content. However, the existence of contained water will generally reduce the reaction velocity so that use of anhydrous solvent is recommendable.

The reaction temperature may preferably be selected within the range between 100 and 200° C., when the solvent consist of ketone(s) selected from the group consisting of acetone and methylethyl ketone. In this case, if the reaction temperature is less than the above specified range, the reaction period will be disadvantageously prolonged. On the contrary, when the reaction temperature exceeds beyond about 200° C., the yield of the desired final product will be disadvantageously decreased by virtue of the formation of olefin caused by the separation of HI from the formed alkyl iodide.

In the case of alkyl iodide having $C_8-C_{12}$ and being most usable, the reaction can be carried out at 100–160° C. for about 8 hours and with a yield of alkyl iodide of about 98 wt. percent.

When the ketone solvent is used in combination with dimethyl acetamide and/or dimethyl formamide, the reaction temperature can be lowered. In this case, however, the amount of dimethyl acid amide may be recommendable to be adjusted to such amount ranging from 0.5 to 15 wt. percent of the total amount of the combined solvent. With lesser amount than 0.5 wt. percent, the effect attainable by addition of dimethyl acid amide will be disadvantageously small. With larger amounts of the added solvent component than the above range the reaction in accordance with the formula (5) may be brought into a balanced condition at a certain constant yield. Therefore, a still higher mixing ratio of the combining solvent component will result in substantially no economical advantage, because the reaction velocity could not be accelerated, accompanying a corresponding increase of the cost of the solvent charge.

By addition of dimethyl acid amide, the reaction can be brought about even at a lower reaction temperature than the boiling point of acetone. However, too much lower reaction temperature, such as that below 50° C., the reaction velocity may be substantially retarded. Therefore, the temperature can advantageously be selected to 50–150° C. The use of dimethyl acid amide will accelerate the separation of HI at higher reaction temperature so that it is recommendable to set it lower than 150° C.

As is clear from the foregoing that the invitation of the reaction of formula (5), the utilization efficiency of iodide can be increased. When considering further the whole steps of the process, it is more important to investigate into optimum recovery and reutilization of excessively used alkyl iodide used in the first step.

The reaction of alkyl iodide with metallic tin in the first step is a kind of heterogenous phase one so that a 20–100% excess quantity of alkyl iodide is used in consideration of the difficulty of realization of a stoichiometric reaction. Therefore, the reaction mixture from this first processing step may generally contain a large amount of non-reacted alkyl iodide. As an example, in the case of an alkyl iodide of less than $C_4$, the non-reacted alkyl iodide may be recovered from the first step and, indeed, by distillation or the like conventional recoverying technique. In the case of higher alkyl iodide of more than $C_8$, the contained alkyl iodide and the formed dialkyltin di-iodide would be thermally decomposed under the high temperature during the distillation step which means naturally an appreciable disadvantage. In addition, it may be stressed that it is highly difficult to select at least a favorable kind of solvent usable for the separation between alkyl iodide and dialkyltin di-iodide.

According to the novel teaching of the present invention, the reaction products from the first step, as containing an appreciable excess amount of alkyl iodide used for the reaction, is utilized as the material for the second step, and the excess alkyl iodide is recovered by use of a proper solvent for the latter and from the solid raw dialkyltin oxide separated from the reaction mixture from the second step, for such purpose that the thus recovered excess alkyl iodide is used again as the material for the first step.

Alkyl iodide and dialkyltin di-iodide can be dissolved in relatively similar solvents. Therefore, if these compounds be separated from each other by solvent, a mutual solution loss may be inevitably invited. However, since it is known that dialkyltin oxide can not almost be dissolved in a solvent, such as lower alcohol, dialkyl acid amide, Cellosolve, lower ketone or the like, which can well dissolve dialkyltin iodide. By utilization of such nature, the both can be separated from each other almost in the perfect way.

The reaction mixture from the second step may contain alkyltin acid, trialkyltin oxide and the like as its by-products, and thus, in order to obtain dialkyltin oxide with high purity, it is preferable to use such solvent as capable of dissolving also these impurities. However, such alkyltin acid and trialkyltin oxide as having $C_8$- or still higher alkyl, have relatively low solubility in lower boiling point solvents such as methanol, ethanol and acetone. Preferable solvents adapted for extraction and removal of higher alkyltin acid and trialkyltin oxide of the similar nature may be: dimethyl acetamide; methyl Cellosolve; ethyl Cellosolve; butyl Cellosolve; n-propanol; i-propanol and methylethyl ketone.

In order to refine the raw dialkyltin oxide with use of any one of the foregoing solvents raised only as an example, the oxide under consideration may be extracted or washed. In this case, solid alkyltin acid is more liable to be washed out or removed when it is in its fused state, the treating temperature may preferably be higher than the melting point of the solid alkyltin acid. As an example, in the case of dodecyltin acid, the melting point is higher thna 80° C., which may frequently be reduced to 70° C. or so, under the influenced by the very existence of impurities. Generally speaking, the treating temperature must preferably be higher than 70° C.

When it is desired to remove alkyltin acid and trialkyltin oxide dissolved in the solvent together with alkyl iodide, they are brought into reaction with hydrochloric acid upon the recovery of the solvent, so as to convert them into corresponding organic tin compounds. Upon separation of the organic phase, it suffices to extract them with dimethyl formamide. In this case, the used solvent dimethyl formamide may dissolve alkyl iodide of less than $C_4$-alkyl, the above procedure can be effectively utilized. However, in the case of such alkyl iodide, as having higher than $C_8$, the solvent may not dissolve it. Therefore, it may well be seen that in the case of the process according to this invention, there will be substantially no loss of alkyl iodide and thus, alkyl iodide can be recovered with a high recovery rate.

In such case that when non-reacted metallic tin is contained in the reaction products of the first step, the metallic tin is dissolved by addition of hydrochloric or other similar acid for removal of the tin, and then, the reaction products can be conveyed to the second step for utilization therein. In this way, a higher purity for the dialkyltin oxide can be attained.

Next, referring to the sole drawing, the process according to the invention will be described in its substance. More comprehensive understanding may be had by reference to the several numerical examples and disclosed in a comparative manner related with comparative conventional techniques to follow.

The drawing is a schematic flow sheet shown in a block form, of a preferred embodiment of a plant arranged for carrying out the process according to this invention.

In the drawing, in a block or section "A" shown only schematically, alkyl iodide is prepared from alkyl chloride and alkali metal iodide. In the section "B," the used solvent in the foregoing section "A" and the formed salts are separated from the alkyl iodide. In the section "C," the solvent is recovered and the formed salts are discarded. In the section "D," dialkyltin di-iodide is manufactured. In the section "E," the reaction products are treated with hydrochloric acid, so as to remove inorganic tin therefrom. In the section "F," dialkyltin di-iodide is subjected to alkali hydrolysis, so as to provide dialkyltin oxide. In section "G," dialkyltin oxide is refined. In section "H," the aqueous alkali solution containing alkali metal iodide formed in the section "F," is neutralized. In the section "J," the aqueous solution of alkali metal iodide is condensed and dehydrated so as to provide solid alkali metal iodide, and at this stage, insufficient amount of alkali metal iodide is supplemented. In the section "K," the solvent is recovered from the solvent phase obtained from the section "G." In the section "L," the residue is treated with hydrocholric acid. In the section "M," organo-tin chloride is extracted from the organic phase obtained in the foregoing section "L," by means of a hydrophilic and organic solvent. In the section "N," alkyl iodide phase and its solvent phase are separated from each other. In the section "P," the solvent is recovered.

EXAMPLE 1

244.72 g. of n-dodecyl alcohol, having 96.24 wt. percent of n-dodecyl alcohol content, 0.72 wt. percent of n-decyl alcohol content and 3.04 wt. percent of n-tetradecyl alcohol, were added previously with 1.78 g. of zinc chloride, and the mixture in a liquid phase was introduced under agitation, firstly with 24 lit./hr. of hydrogen chloride at 150° C. for an hour and secondly with 12 lit./hr. again of hydrogen chloride for 4 hours and 40 minutes. After completion of the reaction, the reaction mixture was held at 55° C. and bubbled with gaseous nitrogen at the rate of 5 lit./hr. for 30 minutes. By this measure, the amount of the dissolved hydrogen chloride was reduced to 0.2 wt. percent. The discharged excess hydrogen chloride during the reaction and bubbling stages was neutralized with caustic soda solution.

The composition of the thus obtained alkyl chloride, 265.22 g., was:

| | Wt. percent |
|---|---|
| n-Dodecyl chloride | 96.10 |
| n-Tetradodecyl chloride | 3.00 |
| n-Decyl chloride | 0.73 |
| The remainder, non-reacted respective alcohols | 0.17 |

The obtained n-dodecyl chloride was reacted at 120° C. for 5 hours with 213.48 g. of sodium iodide in 1028 g. of solvent methylethyl ketone. The used sodium iodide, purity: 93.99 wt. percent, containing as contaminants sodium chloride 2.87 wt. percent and sodium sulfate 3.14 wt. percent, was recovered upon passage through the sections "H" and "J" of the plant schematically shown in the accompanying drawing.

After completion of the reaction, 195.71 g. of n-dodecyliodide were recovered through several sections "K," "L," "M" and "N" of the plant, and added to the product obtained by extraction with water at the section "B" from the reaction mixture, for removal of the solvent methylethyl ketone and inorganic impurities: sodium chloride, sodium sulfite, zinc chloride and the like, the total amount of the n-dodecyl iodide amounting to 564.59 g. upon dried up over calcium chloride. The composition of the n-dodecyl iodide was:

| | Wt. percent |
|---|---|
| n-Dodecyl iodide | 95.23 |
| n-Tetradecyl iodide | 2.73 |
| n-Decyl iodide | 0.72 |
| Non-reacted chlorides, alcohols and the like | 1.05 |

From the composition of the recovered n-dodecyl iodide, the iodide reaction rate at the section "A" and the overall yield at the sections "A" and "B" were calculated to 98.0 wt. percent and 98.0 wt. percent, respectively, representing remarkably higher rates. At the section "C," 976.6 g. of methylethyl ketone were evaporatively recovered from the aqueous solution. The recovery rate amounted to 95.0 wt. percent.

At the section "D," n-dodecyl iodide obtained at the section "B" was added with 74.28 g. of metal zinc powder and 1.90 g. of catalyst triethyl amine, and the reaction mixture was kept at 180° C. for 3 hours for completion of the reaction. Then the reaction mixture was held in the section "E" at 50–60° C. while being agitated and washed for 1 hour with 6 N-hydrochloric acid solution. The hydrochloric aqueous phase was then separated and discarded upon neutralization with alkali.

The thus obtained raw di-n-dodecyltin diiodide was added with 550.70 g. of 10 wt. percent-caustic soda solution in the section "F," for being subjected to hydrolysis. The reaction was carried out at 95–98° C. for 2 hours. The reaction mixture was then cooled with water to normal temperature. In this way, raw di-n-dodecyltin oxide in rods of diameters of 1–3 mm.

641.7 g. of the aqueous alkali phase were separated and 500 g. of water were added thereto for washing and then, 520.9 g. of the aqueous phase were separated. These aqueous phases were combined together and conveyed to the sodium iodide recovery step.

The organic compositon of the raw di-n-dodecyltin oxide obtained through the said alkali hydrolysis step was:

| | | Weight percent |
|---|---|---|
| di-n-Dodecyltin oxide | n-C$_{12}$H$_{25}$\SnO/n-C$_{12}$H$_{25}$ | 44.44 |
| n-Decyl, n-dodecyltin oxide | n-C$_{10}$H$_{21}$\SnO/n-C$_{10}$H$_{25}$ | 0.88 |
| n-Dodecyl, n-tetradecyltin oxide | n-C$_{12}$H$_{25}$\SnO/n-C$_{14}$H$_{29}$ | 3.14 |
| n-Dodecyltin acid | n-C$_{12}$H$_{25}$SnO$_2$H | 5.25 |
| bis-(tri-n-Dodecyltin) oxide | [(n-C$_{12}$H$_{25}$)$_3$Sn]$_2$O | 2.59 |
| n-Dodecyl iodide | | 40.88 |
| Alkyl iodide, alkyl chloride, alcohols | | 2.82 |

The raw di-n-dodecyltin oxide was extracted at the section "G" with use of solvent methylethyl ketone in a Soxlet solid-liquid extractor for removal of contained inpurities. The refluxing cycle of the methylethyl ketone from the bottom of the extractor was performed 11–12 times per hour with the extracting section of the machine kept at 78–79° C. The extracting job extended for 6 hours. The extract, upon dried up, weighed 233.67 g.

The thus extracted and refined di-n-dodecyltin oxide was in the state of a white raw powder, the composition was:

| | Wt. percent |
|---|---|
| n-Dodecyltin acid | 0.50 |
| n-Decyl, n-dodecyltin oxide | 1.81 |
| Di-n-dodecyltin oxide | 91.25 |
| n-Dodecyl, n-tetradecyltin oxide | 6.44 |

It will be seen from the foregoing that the product in terms of di-alkytin oxide, the plurity is higher than 99.5% which is naturally surprising and remarkable. Other compounds could not be detected to include in the product, according to our analysis.

The alkaline aqueous solution of sodium iodide obtained at the section "F" was then conveyed to the section "H" and neutralized by use of 11.08 g. of 35%-hydrochloric aqueous solution. An aqueous sodium iodide solution as obtained from iodide 12.17 g., sodium sulfite 6.04 g. and caustic soda solution 3.84 g. was added to the above neutralized solution and this mixture was then treated at the section "J" to subject it to evaporative dehydration.

213.48 g. of sodium iodide thus recovered contained, as was referred to:

| | Wt. percent |
|---|---|
| Sodium chloride | 2.87 |
| Sodium sulfate | 3.14 |

This sodium iodide containing them can be used as per se for feeding the section "A." The methylethyl ketone solution obtained in the refining step at the section "G" and containing n-dodecyl iodide and the like, was subjected to a recovery step of methylethyl ketone at the section "K" through evaporative separation. In this way, 2237.4 g. of methylethyl ketone were recovered with a recovery yield of 92%.

The n-dodecyl iodide thus having been deprived of the containing methylethyl ketone was conveyed to the section "L" and reacted under agitation at 80° C. for 1 hour with 81.55 g. of 35%-hydrochloric aqueous solution for chlorination of the contained n-dodecyltin acid and bis-(tri-n-decyltin) oxide. Upon completion of this treatment, the separated hydrochloric aqueous solution was neutralized with 10 wt. percent-caustic soda solution and then discarded.

The organic phase having as its main constituent, 243.58 g. of n-dodecyl iodide upon subjection to the hydrochloric acid treatment was conveyed to the section "M" and subjected to a liquid-to-liquid extraction with 400 g. of dimethyl formamide. Then, 195.71 g. of n-dodecyl iodide separated in the section N amounted to 195.71 g., having a composition of:

| | Wt. percent |
|---|---|
| n-Dodecyl iodide | 93.54 |
| n-Tetradecyl iodide | 2.40 |
| n-Decyl iodide | 0.64 | thus showing a remarkably high content of n-dodecyl iodide. The thus recovered n-dodecyl iodide having the above composition was combined with the product obtained at the section "A," and conveyed to the section "B."

The dimethyl formamide used in the extraction was recovered at the section P through water extraction and distillation. Its recovery rate: 96%.

EXAMPLE 2

Manufacture of alkyl iodide

Into a stainless autoclave, capacity 200 ml., fitted with agitator, 14.9 g. (0.1 mole) of n-octyl chloride, of purity higher than 99%, 16.5 g. (0.11 mole) of sodium iodide and 80 g. of solvent methylethyl ketone, preparatorily dried over anhydrous sodium sulfate were charged and kept at 120° C. for 2 hours for reaction. The reaction pressure amounted to 1.5 kg./cm.$^2$, gauge.

Upon completion of the reaction, the reaction mixture was cooled down to room temperature, and then added with a quantity of water enough to dissolve the solvent methylethyl ketone, non-reacted sodium iodide and formed sodium chloride, and the resulted solution was transferred through 1-lit. fraction flask to a receptacle vessel wherein the contents were added with 200 ml. of ethyl ether for extraction of the organic substances. The aqueous phase was separated and washed twice with water. The ether phase was dried over anhydrous calcium chloride, filtered and deprived of the solvent. In this way, a liquid 22.5 g., which contained n-octyl iodide, 88.84 wt. percent, and n-octyl chloride, 11.05 wt. percent, was obtained. The remaining 0.11 wt. percent consisted substantially of 1-octene. The composition was analyzed by gas chromatography. The conversion rate of n-octyl chloride to n-octyl iodide amounted to 83.20%.

Several similar experiments were carried out with different selection of material alkyl chloride, solvent, reaction temperature and reaction period, as per the conditions and results shown in the following Table 1.

TABLE 1

| Experiment number | St. Mat. Alkyl chloride | Solvent | Reaction conditions Temp., °C. | Reaction period, hrs. | Comp. of reaction product (mole percent) Olefin | Alkyl chloride | Alkyl iodide |
| --- | --- | --- | --- | --- | --- | --- | --- |
| 1 | n-Octyl | MEK | 120 | 2 | 0.11 | 11.05 | 88.84 |
| 2 | do | MEK | ¹80 | 2 | 0.07 | 56.90 | 43.04 |
| 3 | n-Dodecyl | MEK | 120 | 4 | 0.22 | 1.60 | 98.18 |
| 4 | do | MEK | 110 | 4 | 0.20 | 3.21 | 96.59 |
| 5 | do | MEK | ¹80 | 8 | 0.14 | 23.26 | 76.60 |
| 6 | do | Acetone | 120 | 2 | 0.15 | 1.24 | 98.61 |
| 7 | do | do | ¹60 | 8 | 0.71 | 33.20 | 66.09 |
| 8 | n-Octadecyl- | do | 120 | 4 | 0.13 | 3.27 | 96.60 |
| 9 | n-Octyl- | MEK+DMA (DMA 1.25 wt. percent) | ¹80 | 5 | 0.13 | 2.65 | 97.22 |
| 10 | n-Dodecyl- | MEK+MMA (DMA 3.75 wt. percent) | ¹80 | 8 | 0.16 | 3.21 | 96.63 |
| 11 | do | MEK+DMF (DMF 6.25 wt. percent) | ¹80 | 6 | 0.11 | 3.84 | 96.05 |
| 12 | do | Acetone + MMA (DMA 1.25 wt. percent) | 100 | 2 | 0.22 | 1.98 | 97.80 |

¹ Under reflux.
NOTE.—MEK=methylethyl ketone; DMA=dimethylacetamide; DMF=dimethylformamide.

EXAMPLE 3

Manufacture of dialkyltin oxide

Raw di-n-hexadecyltin oxide, having a composition of n-hexadecyl iodide 27.22 wt. percent, n-hexadecyltin acid 8.78 wt. percent, di-n-hexadecyltin oxide 61.30 wt. percent and bis-(tri-n-hexadecyltin) oxide 2.70 wt. percent, was charged into a 1-lit. flask fitted with reflux condenser, thermometer and agitator, and added with solvent and then subjected 2–3 times to washing and filtering under heated conditions. Then, the reaction mixture was washed twice with water at room temperature and dried up. The thus obtained refined di-n-hexadecyltin oxide was treated with hydrochloric acid to di-n-hexadecyltin dichloride and then the composition was analyzed through the gas chromatography. Further several similar experiments were performed wherein butyl Cellosolve and acetone (as reference) were used in place of dimethyl acetamide. The reaction conditions and the results are shown in the following Table 2.

TABLE 2

| Experiment number | 13 | 14 | 15 (Ref.) |
| --- | --- | --- | --- |
| Amount of sample, grams | 100 | 100 | 100 |
| Solvent | (¹) | (²) | (³) |
| Quantity of solvent, cc./treatment | 400 | 300 | 400 |
| Number of washing treatments | 3 | 3 | 3 |
| Washing period per treatment, min | 30 | 30 | 30 |
| Washing temp., °C | 140 | 140 | (⁴) |
| Composition, in wt. percent, of the product after purification and refinery: | | | |
| n-Hexadecyl iodide | 0 | 0 | 0.03 |
| n-Hexadecyltin acid | 3.84 | 1.73 | 12.48 |
| di-n-Hexadecyltin oxide | 96.16 | 98.27 | 87.22 |
| bis-(tri-n-Hexadecyltin)oxide | 0 | 0 | 0.27 |

¹ Dimethyl acetamide.
² Butyl Cellosolve.
³ Acetone.
⁴ Under reflux.

EXAMPLE 4

Refinery of dialkyltin oxide

Raw di-n-dodecyltin oxide having a composition of n-dodecyl iodide (n-C₁₂H₂₅I) 28.94 wt. percent, n-dodecyltin acid 9.67 wt. percent, di-n-dodecyltin oxide 61.15 wt. percent and bis-(tri-n-dodecyltin) oxide 0.24 wt. percent, was refined under the similar treating conditions as in the foregoing Example 1, yet with use of several different solvents as enlisted in the following Table 3.

As seen from Examples 3, 4 and 5, the purity of the product with use of the solvents as recommended by and in the present invention is amazingly high in comparison with use of conventional solvents such as acetone (Exp. No. 19) and methanol (Exp. No. 20), and the purification and refinery can be executed by reliance of washing under heated conditions.

TABLE 3

| Experiment number | 16 | 17 | 18 | 19 (Ref.) | 20 (Ref.) |
| --- | --- | --- | --- | --- | --- |
| Amount of sample, grams | 100 | 150 | 100 | 100 | 100. |
| Solvent | Dimethyl acetamide | Dimethyl acetamide | Methylethyl ketone | Acetone | Methanol. |
| Quantity of solvent, cc./treatment | 400 | 400 | 400 | 400 | 400. |
| Number of washing treatments | 2 | 2 | 3 | 3 | 3. |
| Washing period per treatment, min | 30 | 30 | 30 | 30 | 30. |
| Washing temp., °C | First time 60, Second time 120 | 120 | Under reflux | Under reflux | Under reflux. |
| Composition, in wt. percent, of the product after purification and refinery: | | | | | |
| n-Dodecyl iodide | 0.03 | 0 | 0.83 | 0.54 | 8.29. |
| n-Dodecyltin acid | 2.91 | 1.28 | 4.74 | 9.16 | 12.50. |
| di-n-Dodecyltin oxide | 97.06 | 98.72 | 94.43 | 91.30 | 79.21. |
| bis-(tri-n-Dodecyltin)oxide | 0 | 0 | 0 | 0 | Trace. |

EXAMPLE 5

Purification and refinery of dialkyltin oxide

Raw di-n-octyltin oxide having a composition of n-octyl iodide 21.4 wt. percent, n-octyltin acid 4.56 wt. percent, di-n-octyltin oxide 73.19 wt. percent and bis-(tri-n-octyltin) oxide 0.58 wt. percent, was treated with several different solvents disclosed in the following Table 4 for refining at heated conditions and as substantially similarly as set forth in the foregoing Example 1.

The composition of the thus refined di-n-octyltin oxide is shown in the Table 4.

With use of the solvents recommended by and in the present invention, remarkably higher purity was attained as seen clearly by comparison with the reference experiments shown in the same table.

TABLE 4

| Experiment number | 21 | 22 | 23 | 24 (Ref.) |
| --- | --- | --- | --- | --- |
| Amount of sample, grams | 100 | 100 | 100 | 100. |
| Solvent | Dimethyl acetamide | Methyl Cellosolve | n-Propanol | Acetone. |
| Quantity of solvent, cc./treatment | 300 | 400 | 400 | 400. |
| Number of washing treatments | 2 | 2 | 3 | 3. |
| Washing period per treatment, min | 30 | 30 | 30 | 30. |
| Washing temp., °C | 120 | 120 | Under reflux | Under reflux. |
| Composition, in wt. percent, of the product after purification and refinery: | | | | |
| n-Octyl iodide | 0.02 | 0.02 | 0.12 | 0.02. |
| n-Octyltin acid | 1.14 | 1.08 | 2.73 | 5.67. |
| di-n-Octyltin oxide | 98.84 | 98.90 | 97.15 | 94.31. |
| bis-(tri-n-Octyltin) oxide | 0 | 0 | 0 | 0. |

EXAMPLE 6

Purification and refinery of dialkyltin oxide

Raw di-n-dodecyltin oxide having a composition of n-dodecyl iodide 28.26 wt. percent, n-dodecyltin acid 10.76 wt. percent and di-n-dodecyltin oxide 60.38 wt. percent, was purified and refined with use of 4 kg.- and 40 kg.-capacity Soxlet type extractors with use of solvents as enlisted in the following Table 5. The refluxing cycle was of 60 minutes.

With use of the 4 kg.-capacity machine, the raw di-n-dodecyltin oxide was not divided into small quantities and charged as a whole into the extractor fitted with filter means.

On the other hand, with use of the 40 kg.-capacity machine, the raw material was divided into small quantities and each of the divided quantities was charged into an open cylindrical bag, 2 kg.-capacity, made of proper filtering cloth. Then, the thus divided materials were treated through the machine in successive order with proper time lags.

The composition of the thus refined di-n-dodecyltin oxide is shown in the following Table 5. Purification period could be remarkably shortened by obeying the novel teachings of the invention.

TABLE 5

| Experiment number | Solvent | Capacity kgs. | Cycle | Composition, in wt. percent, of the product after purification and refinery | | |
|---|---|---|---|---|---|---|
| | | | | n-Dodecyl iodide | n-Dodecyl-tin acid | di-n-Dodec-yltin oxide |
| 25 | Methylethyl ketone | 4 | 12 | 0 | 0.97 | 99.03 |
| 26 | do | 4 | 12 | 0 | 0.88 | 99.12 |
| 27 | Isopropyl alcohol | 4 | 12 | 0 | 0.92 | 99.08 |
| 28 | n-Propyl alcohol | 4 | 10 | 0 | 0.95 | 99.05 |
| 29 | Methylethyl ketone | 40 | 40 | 0.20 | 1.64 | 98.16 |
| 30 | do | 40 | 50 | 0 | 1.56 | 98.44 |
| 31 | do | 40 | 50 | 0 | 1.21 | 98.79 |
| 32 (Ref.) | Acetone | 4 | 10 | 0.53 | 12.90 | 96.57 |
| 33 (Ref.) | do | 4 | 21 | 0.25 | 5.06 | 94.69 |
| 34 (Ref.) | do | 40 | 70 | 0.08 | 4.59 | 95.33 |

The embodiments of the invention in which an exclusive property or privilege is claimed are as follows:

1. A process for the manufacture of dialkyltin oxide, comprising a first step for reacting a corresponding alkyl iodide with metallic tin to the corresponding dialkyltin di-iodide, and a second step for reacting the dialkyltin di-iodide thus obtained with hydroxide of an alkali metal to the dialkyltin oxide, wherein the aqueous alkaline solution obtained from the reaction products of the second step upon separation of the raw dialkyltin oxide formed in the second step and containing an excess amount of alkyl iodide in the first step, said solution yet containing alkali metal iodide, is neutralized and dehydrated and the recovered alkali metal iodide is reacted with alkyl chloride in a water-soluble organic solvent to alkyl iodide which is then returned to the first step for recirculation.

2. A process for the manufacture of dialkyltin oxide, comprising a first step for reacting alkyl iodide and metallic tin to dialkyltin iodide, and a second step for reacting dialkyltin di-iodide obtained at the first step with alkali metal hydroxide to dialkyltin oxide, wherein from the reaction products from the second step, raw dialkyltin oxide containing excess amount of alkyl iodide used in the first step, alkyl iodide is extracted with a water-soluble organic solvent from the raw dialkyltin oxide, the alkyl iodide is recovered from the extract, the mother liquid obtained from the reaction products in the second step and upon the separation of said raw dialkyltin oxide is neutralized and dehydrated to recover alkali metal iodide, the recovered alkali metal iodide and alkyl chloride are reacted with each other in a water-soluble organic solvent to alkyl iodide which is added with the alkyl iodide recovered from the said extract and returned to the first step for recirculation.

3. The process of claim 1, wherein the solvent for the reaction of the recovered alkyl chloride is at least a member selected from the group consisting of acetone and methylethyl ketone.

4. The process of claim 3, wherein the reaction of the recovered alkali metal iodide with alkyl chloride, is carried out at a temperature between 100° C. and 150° C.

5. The process of claim 1, wherein the solvent used for the reaction of the recovered alkali metal iodide with alkyl chloride is a mixture of acetone and/or methylethyl ketone containing 0.5–15 wt. percent of dimethyl acetamide and/or dimethyl formamide.

6. The process of claim 4, wherein the reaction of recovered alkali metal iodide with alkyl chloride is carried out at 50–150° C.

7. The process of claim 2, wherein the water-soluble organic solvent used for extraction of the raw alkyltin oxide separated from the reaction products of the second step is at least a member selected from the group consisting of dimethyl acetamide, methyl Cellosolve, ethyl Cellosolve, butyl Cellosolve, n-propanol, i-propanol and methylethyl ketone.

8. The process of claim 2, wherein the raw alkyl iodide as obtained upon recovery of the solvent from the extract of raw dialkyltin oxide separated from the reaction products of the second step, is subjected to a further extraction step with dimethyl formamide so as to remove the containing organic tin compounds and the thus refined alkyl iodide is returned to the first step for recirculation.

References Cited
UNITED STATES PATENTS

| | | | |
|---|---|---|---|
| 3,493,592 | 2/1970 | Shapiro et al. | 260—429.7 |
| 3,466,311 | 9/1969 | Mizuno et al. | 260—429.7 |
| 3,448,130 | 6/1969 | Oakes et al. | 260—429.7 |
| 3,390,159 | 6/1968 | Katsumura et al. | 260—429.7 |
| 3,376,329 | 4/1968 | Kobetz et al. | 260—429.7 |
| 2,867,642 | 1/1959 | Ramsden et al. | 260—429.7 |

DANIEL E. WYMAN, Primary Examiner

P. F. SHAVER, Assistant Examiner

UNITED STATES PATENT OFFICE
CERTIFICATE OF CORRECTION

PATENT NO. : 3,813,424
DATED : May 28, 1974
INVENTOR(S) : Yasuo Hayashi et al

It is certified that error appears in the above-identified patent and that said Letters Patent are hereby corrected as shown below:

Col. 1, line 23, at the end of the line, delete "appeared" and substitute therefor, -- appearing --.

Col. 2, line 7, after "hand" and before "the" (second occurrence) insert, -- with --;
line 27, delete "by, such as" and substitute therefor, -- such as by --;
line 28, after the comma (,) delete "it is encountered that";
same line, after "of" and before "alkyl" insert, -- the --;
line 42, after "of" and before "specifically" insert, --a solvent --.

Col. 3, line 22, delete "used" and insert, -- using --;
line 30, delete "more" and substitute therefor, -- a --;
line 39, delete "dependently" and substitute therefor, -- independently --;
line 49, delete "upon";
line 50, after "solvent" insert, -- in an amount --;
lines 51 and 52, delete "two times" and insert, -- the amount --;
line 60, after "times" insert, -- the amount --;
line 74, delete "beyond".

Col. 4, line 10, delete "acid amide" and insert, -- acetamide --;
line 14, delete "acid amide" and insert, -- acetamide --;
line 24, delete "acid amide" and insert, -- acetamide --;
lines 26 and 27, delete "too much lower" and insert, -- at a --;
line 27, after "temperature" insert, -- too much lower --;
line 29, after "to" insert, -- be --;
line 30, delete "acid amide" and insert, -- acetamide --;
line 35, after "further" insert, -- all --;
line 36, delete "whole";
line 71, delete "since";
line 72, after "can" delete "not almost" and insert, --almost not--

UNITED STATES PATENT AND TRADEMARK OFFICE
CERTIFICATE OF CORRECTION

PATENT NO. : 3,813,424
DATED : May 28, 1974
INVENTOR(S) : Yasuo Hayashi et al

It is certified that error appears in the above-identified patent and that said Letters Patent are hereby corrected as shown below:

Page 2.

Col. 4, line 73, delete "acid amide" and insert, -- acetamide --;
        line 75, delete "the".
Col. 5, line 6, after "such" insert, -- a --;
        same line, before "capable" insert, -- is --;
        line 19, before "solid" insert, -- since --;
        line 25, delete "influenced by" and insert, -- influence of --.
Col. 6, lines 51 and 52, delete "upon dried up" and insert, --drying --.
Col. 7, line 29, change the radical in the formula "n-$C_{10}H_{25}$" to, -- n - $C_{12}H_{25}$ --;
        lines 44 and 45, delete " inpurities" and insert, --impurities --;
        line 49, delete "upon dried up" and insert, -- after drying --;
        line 62, delete "to include" after "detected".
Col. 8, line 58, delete "resulted" and insert, -- resulting --.
Col. 9, line 29, after "dried" delete "up";
        line 32, before "gas" delete "the"

Signed and Sealed this sixteenth Day of December 1975

[SEAL]

Attest:

RUTH C. MASON
*Attesting Officer*

C. MARSHALL DANN
*Commissioner of Patents and Trademarks*